(12) United States Patent
Dooley et al.

(10) Patent No.: US 8,165,928 B2
(45) Date of Patent: Apr. 24, 2012

(54) MANAGING EVENTS WITHIN SUPPLY CHAIN NETWORKS

(75) Inventors: John J. Dooley, Mountain View, CA (US); Xi Li, Sunnyvale, CA (US)

(73) Assignee: Savi Technology, Inc., Mountain View, CA (US)

( * ) Notice: Subject to any disclaimer, the term of this patent is extended or adjusted under 35 U.S.C. 154(b) by 484 days.

(21) Appl. No.: 09/919,567

(22) Filed: Jul. 30, 2001

(65) Prior Publication Data

US 2004/0015418 A1   Jan. 22, 2004

Related U.S. Application Data

(60) Provisional application No. 60/254,125, filed on Dec. 7, 2000.

(51) Int. Cl.
*G06Q 10/00* (2012.01)
(52) U.S. Cl. .............. 705/28; 705/22; 705/23
(58) Field of Classification Search .......... 705/28, 705/22, 23; 709/230
See application file for complete search history.

(56) References Cited

U.S. PATENT DOCUMENTS

| | | | |
|---|---|---|---|
| 4,688,244 A | 8/1987 | Hannon et al. | |
| 4,750,197 A | 6/1988 | Denekamp et al. | |
| 5,185,700 A * | 2/1993 | Bezos et al. ............. | 364/424.04 |
| 5,398,336 A * | 3/1995 | Tantry et al. ............. | 707/103 R |
| 5,572,640 A * | 11/1996 | Schettler ................... | 345/440 |
| 5,848,373 A * | 12/1998 | DeLorme et al. ............. | 701/200 |
| 6,067,525 A * | 5/2000 | Johnson et al. .................. | 705/10 |
| 6,148,291 A | 11/2000 | Radican | |
| 6,172,596 B1 | 1/2001 | Cesar et al. | |
| 6,211,781 B1 * | 4/2001 | McDonald .................... | 340/505 |
| 6,219,774 B1 * | 4/2001 | Hammond et al. ............ | 711/202 |
| 6,286,033 B1 * | 9/2001 | Kishinsky et al. ............ | 709/203 |
| 6,763,499 B1 * | 7/2004 | Friedman et al. .............. | 715/513 |
| 6,904,562 B1 * | 6/2005 | Hind et al. ..................... | 715/515 |
| 7,366,522 B2 * | 4/2008 | Thomas .................... | 455/456.1 |
| 2002/0029176 A1 | 3/2002 | Carlson et al. | |
| 2002/0038267 A1 | 3/2002 | Can et al. | |
| 2002/0070862 A1 | 6/2002 | Francis et al. | |

OTHER PUBLICATIONS

Microsoft Corporation, "Computer Dictionary", Microsoft Press, third edition, 1997, p. 129.*
Zuckerman, A., Chapter 3: Technology Trends—Transportation and Logistics Empower the New Economy, Copyright @ 2001 pp. 1 of 19.
PCT International Search Report PCT/US02/01743, Jan. 22, 2002, Date of Mailing: Sep. 19, 2002 (5 pgs.).
Notification of the International Search Report and Written Opinion, PCT/US04/11086, Sep. 5, 2006, 10 pages.

* cited by examiner

*Primary Examiner* — Ramsey Refai
(74) *Attorney, Agent, or Firm* — Fenwick & West LLP (57) ABSTRACT

A supply chain network system comprises a site data appliance (SDA) and a Universal Data Appliance Protocol (UDAP) adapter coupled with one or more data source equipments (DSE). The SDA collects specification information comprising event information from the one or more DSE. A server is coupled with the SDA in the supply chain network. In response to the server requesting the specification information, the SDA sends to the server the specification information in a Description Document. A data center (DC) is coupled with the server in the supply chain network. The DC receives the Description Document and maps the event information in the specification information with event handlers. A mapping of the event information with the event handlers is sent from the DC to the server. When an event is generated by the one or more DSE, the map is used to select an appropriate event handler to execute.

20 Claims, 10 Drawing Sheets

```xml
<sda>
    <udap>0.88</udap>
    <devapp>Jeff Bain #1</devapp>
    <manufacturer>Savi</manufacturer>
    <url>www.Savi.com</url>
    <product>Savi Data Appliance></product>
    <model>915</model>
    <date>27-10-00</date>
    <udn>0000:00000915:000001</udn>
    <name>Refrigerator3</name>
    <notepad>Custom for GP montiors temerature</notepad>
    <control<TESTMODE</control>
    <service></service>
    <log>
        <control></control>
        <service></service>
        <event code=5>LOST</event>
        <queued>0</queued>
        <lost>0</lost>
        <clear/>
        <threshold>70</threshold>
        <capacity>32768</capacity>
        <delay>30</delay>
    </log>
    <reset/>
    <rfid>
        <name>AWID Model 1</name>
        <version>123456</version>
        <description>service by NC on 12/31/01</description>
        <control>ENABLE></control>
        <service></service>
        <antenna>
            <event>FAIL+RESTORE</event>
            <RSSI>0</RSSI>
        </antenna>
        <antenna>
            <event>FAIL+RESTORE</event>
            <RSSI>0</RSSI>
        </antenna>
        <analog>
            <power>10</power>
            <sensitivity>3</sensitivity>
        </analog>
        <collect>
            <event>DEPARTURE</event>
            <eventcfg>
                <source>INDEX</source>
                <rssi>YES</rssi>
            <eventcfg>
                <control>COLLECT</control>
```

FIG. 5A

```
        </collect>

<readcfg>
            <attempts>3</attempts>
            <timeout>100 </timeout>
515 ─┤  </readcfg>
        <read/>
        <writecfg>
            < attempts>1< /attempts>
        </writecfg>
        <write/>
    </rfid>
    <clock >
        <name></name>
520 ─┤  <version></version>
        <control>ENABLE</control>
        <date>2001-03-15</date>
        <time>21:34:56</time>
    </clock>
    <serial >
        <name></name>
        <version>10000002-0000-0000-0000-000000000001</version>
        <description>Barcode attached</description>
        <control></control>
        <service></service>
        <direction>DCE</direction>
525 ─┤  <baud>9600</baud>
        <bits>8</bits>
        <stop>1</stop>
        <parity>NONE </parity>
        <xts></xts>
        <dxr></dxr>
        <dcd></dcd>
        <read />
        <write/>
    </serial>
    <parallel>
        <name></name>
        <version>10000002-0000-0000-0000-000000000002</version>
        <description>Thremo King 5R - temp in centigrade</description>
530 ─┤  <control>HIGH</control>
        <service></service>
        <event>HIGH</event>
        <debounce>30</debounce>
        <high>15</high>
        inmask>0xFF</inmask>
        <port/>
    </parallel>
</sda>
```

FIG. 5B

| | | |
|---|---|---|
| name: | DOCK12 | |
| ip: | 169.254.1.22 | |
| udn: | 0000-00734567-000001 | 605 |
| model | TagMaster Bridge | |
| service: | OK | |
| rfid[0] | inbound<br>service : OK | |
| rfid[1] | outbound<br>service : OK | |

| | | |
|---|---|---|
| name: | Wash Station | |
| ip: | 169.254.1.23 | |
| udn: | 0000-00734567-000002 | 610 |
| model: | SDA915 | |
| service: | OK | |
| rfid: | amtech/scs<br>service:OK | |
| serial | Symbol PDF-417<br>service: OK | |

| | | |
|---|---|---|
| name: | Refrigerator | |
| ip: | 169.254.1.27 | |
| udn: | 0000-00734567-000023 | 615 |
| model: | SDA915 | |
| service: | DEVICE | |
| rfid: | (none)<br>service: ANTENNA | |
| serial | Thermo King 780<br>service: OK | |

MANAGING EVENTS WITHIN SUPPLY CHAIN NETWORKS

This application claims priority to a provisional application having Ser. No. 60/254,125 filed on Dec. 7, 2000.

FIELD OF THE INVENTION

The present invention relates generally to the field of supply chain management. More specifically, the present invention is directed to method and system for monitoring and managing readers in supply chain networks.

BACKGROUND

Once considered expensive and impractical, radio frequency identification (RFID) technology has proven to be an efficient way to obtain real-time supply chain visibility. RFID is more versatile than other identification technologies because RFID can collect and communicate information about inventory. Unlike bar codes, which can store only a few bits of data, RFID tags can store several thousand bits of data.

RFID tags differ from bar codes primarily in the way in which they are read. While an optical device reads a bar code, radio frequencies read the information stored in an RFID tag (or RFID device). In addition, the RFID tag contains a microprocessor and memory that can store a variety of information about the article to which the tag is attached, such as expiration dates and other specific information. Additionally, this information can be updated when required. An antenna coupled with an RFID reader is used to transmit and receive radio frequency (RF) signals between the RFID reader and the RFID tag. An RF transceiver coupled with the RFID reader controls and modulates the RF that the antenna transmits and receives. When the RFID tag passes into the energy field of the antenna of the RIFD reader, the RFID tag receives the RF signals and transmits a response back to the reader. RFID requires no operator intervention to read the tag. The tag needs not be in sight to be scanned. In addition, RFID readers and tags may operate with anti-collision or collision resolution algorithms, allowing multiple tags to be read simultaneously.

RFID readers may also be used in conjunction with other readers (e.g., bar code readers) to improve asset tracking in supply chain applications. For example, readers in one supply chain application may include bar-code readers, radio frequency identification readers, smart card readers, etc. These readers generate asset flow information. Other readers, such as presence detectors, bar-code printers, RFID write stations or hand-held readers may be required for registering the asset into the supply chain application system. Each of these may be connected in a network to provide accurate location and status information of the asset.

Readers performing the same functions but manufactured by different vendors may have different interface specifications and configuration parameters. Because of this, it may be complex and expensive to manage a supply chain network having heterogeneous types of readers. For example, a supply chain network may utilize bar-code labels and RFID tags with different technologies, thus requiring RFID readers from different manufacturers as well as a bar-code reader from a third manufacturer.

The interface specification for each of the readers may be different (e.g., LonWorks, RS-485, and RS-232). An RFID reader suitable for pallet tracking may require significantly different configuration and monitoring than an RFID reader used for tags embedded in reusable plastic containers contained on the pallet. Furthermore, many supply chain applications require a mix of readers. For example, a package carrier may need a significantly different set of readers than a retail grocery distribution system, even though both use the same supply chain to monitor and track the same goods.

From the foregoing, it is evident that configuration management of supply chain sites presents an administrative problem. The installation, configuration, trouble diagnosis and other requirements of the diverse equipment necessitate a methodical, well planned approach. Conventional paper based methods of handling configuration and maintenance are not sufficient to handle the diversity of sites. In addition, a typical supply chain will have various equipment installed at many sites separated by great distances and in different countries. Maintaining a supply chain of this diversity could easily become costly and inefficient. It is the object of this invention to provide an easy and cost effective solution to the problems of management of a supply chain network in a heterogeneous environment.

SUMMARY OF THE INVENTION

A system for configuring and managing a supply chain network is disclosed. In one embodiment, a location where the supply chain network requires visibility into the movement of goods is provided with one or more site data appliances (SDA). Each SDA is coupled with one or more data source equipments (DSE) which may comprise devices of diverse technology and manufacture, including bar-code readers and radio frequency identification (RFID) tag readers. The system also comprises site servers (SS), one or more of which may be at the location. The role of the SS is to provide management and control of the SDA and to interface the SDA to the supply chain network. Each SDA is connected to one of the SS. The system also comprises one or more data centers (DC) which may be at the site or at a distant location. The DC provides high level user interface to the data gathered in the supply chain and to manage and direct operations in the event of operation miscues or errors such as tag read errors. Each SS is connected to one of the DC.

Communications between an SDA and its associated SS are managed using a protocol which handles communications for initiation, configuration and management information. This protocol is referred to as Universal Data Appliance Protocol (UDAP) and will be described in more detail below. Management information comprises the configuration data and object hierarchy, property and event information obtained from the SDA and from each DSE controlled by the SDA. The information for each DSE is assembled into a Description Document which becomes the single, authoritative source of information about the characteristics, data handling procedures and event descriptions particular to a DSE or to a plurality of DSE managed by an SDA.

The Description Document is assembled by the SDA on request of the SS as part of the process of installation, initiation or configuration of a site. On this request, the SDA collects the configuration data and other information from the DSE and also from its own configuration data. The data is formatted into the Description Document using extensible markup language (XML) to mark the data with standardized tags and other descriptive coding, and then sent to the SS using the UDAP protocol. The SS in turn sends the Description Document to the DC which maps the event type information from the specification information with event handlers which specify when and what is to occur as a result of the event, for example, how tag reads are to be processed, or what and how, and to whom and by what means, notification is to be made if a reader failure occurs. The map of event and event handlers is then sent from the DC to the SS. When an event, which may be a tag read or an exception occurrence, is generated by the one or more DSE, or even by the SDA itself, the map is used by the SS to select the appropriate event handler and equipment to execute the appropriate action according to instructions in the Description Document.

Reconfiguration or other modification of the DSE is also processed using the Description Document as the reference, providing the information needed to process, for example, a change in reader parameters or to install a different reader model or type.

The significant advantages of the Description Document and UDAP are the uniformity of the parametric language, increase in speed and facility with which complex system changes can be performed, and the ease with which event information and diagnostic information can be handled in the supply chain network management system.

Other objects and features and advantages of the present invention will be apparent from the accompanying drawings and from the detailed description which follows.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIGS. 5A and 5B illustrate a Description Document using XML.

DETAILED DESCRIPTION

A method for managing a supply chain network is disclosed. The supply chain networks may include readers such as radio frequency identification (RFID) readers or bar code readers that read data from tags, barcodes, etc. The readers are coupled with a data appliance. The readers may have similar or different interface specifications. The data appliance collects the interface parameters, along with additional information from the readers, into a Description Document which is sent to a server to be used for network management in the supply chain network.

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

In this description, the data appliance is referred to as a site data appliance (SDA). A reader (e.g., RFID reader) is referred to as a DSE. A tag (e.g., RFID tag or bar code tag) is referred to as a data source. Network topology at any given site may have an SDA configured to communicate with one or more DSE. The server is referred to as a site server (SS). An SS may be configured to communicate over a network with one or more SDA. Communications between the SDA and SS over the network are governed by the Universal Data Appliance Protocol (UDAP) protocol, a set of rules defining the communication process. A data center (DC) refers to a data processing system that communicates with one or more SS and with the supply chain users. Within this description, references will be made to the term <CRLF>. This is to be understood in the context of conventional software terminology as "Carriage Return—Line Feed", a common delimiter used in data and control messages.

The interface specification includes the hierarchy of objects representing different components of the SDA and the DSE, and property, method and event information of the SDA and DSE. For example, the property information may include configuration, memory, antenna sensitivity, etc. The method information may include commands to read or write the data source, etc. The event information may include event type, event data, etc.

The SS also maintains a Configuration Table. Before an SDA can be controlled by the SS and tag data be received from an SDA, the SDA must be registered in the Configuration Table. In the preferred embodiment, the registration process is termed discovery. The process of discovery of an SDA comprises sequences wherein the SDA uploads its Description Document to the SS, there to be processed and information extracted from it stored in the Configuration Table. Since the Description Document contains the property and method elements for the SDA and thus provides all the information needed by the SS to monitor and control the SDA, the Description Document has a complete description of the SDA and the DSE.

After the discovery process, the SS may issue commands to the SDA and receive tag data or event information from the SDA, following the syntax and procedures listed in the Description Document. The SS also refers to Description Document data in the Configuration Table when network management and SDA configuration is required.

UDAP

The following describes the Universal Data Appliance Protocol (UDAP) components and the role in which each plays in the management system. The Universal Data Appliance Protocol (UDAP) is comprised of six protocols, four of which are new in accordance with the present invention. The system uses these protocols for installation, discovery and configuration processes, to exchange commands and data between system elements and to handle events occurring in the normal (e.g., tag reads or routine status checks) or abnormal (i.e., an error condition) course of operation. In the preferred embodiment, the complete suite of six are used. The protocols are summarized as follows:

BOOTP BOOTP, a UDP protocol. Standard according to RFC951 and RFC952. May be used by the SDA to request an IP address from the SS. In the conventional configuration, the SS listens to BOOTP requests on UDP port 67 and the SDA receives its IP address on UDP port 68.

NDAP Notification Data Appliance Protocol, a UDP protocol new in this invention. The NDAP Notification Request packet is used in the discovery process to initiate the Description Document upload process.

DDAP Discovery Data Appliance Protocol, a UDP protocol new in this invention. The DDAP Discovery Request packet is used in the discovery process when the Description Document is uploaded.

CDATP Control Data Appliance Transfer Protocol, a TCP protocol new in this invention. CDATP handles command and response communications between the SDA and the SS and also the transfer of the Description Document from the SDA to the SS during discovery.

EDATP Event Data Appliance Transfer Protocol, a TCP protocol new in this invention. EDATP handles events and acknowledgments between the SS and the SDA.

SNTP Simple Network Time Protocol, a UDP protocol standard according to RFC1769. Used to synchronize time between the SS and all SDA on the network. In the conventional configuration, the SS and SDA both use UDP port 123.

The protocols are further explained in the following sections:

NDAP—Notification Data Appliance Protocol

NDAP is a UDP protocol that the SDA uses whenever it is required to establish or refresh its Description Document and the data in the Configuration Table. Typically this is performed when the SDA is initially installed or when the site network is reconfigured or the SDA assigned a new IP address. The SDA sends an NDAP Notification Request packet every NDAP_INTERVAL seconds and terminates the NDAP Requests when the SS requests the Description Document. If a DDAP Discovery Request (discussed later in this description) is received while Notification Requests are being sent, the Notification packets are suspended for DDAP_INTERVAL* DDAP_TRIES seconds. The packet specifies DDAP_PORT, the port at which the SDA will listen for the DDAP request packet. In the preferred embodiment, DDAP_PORT is 10001, DDAP_TRIES is 3 and NDAP_INTERVAL is 10 seconds. Following is a notification Request message format:

NDAPRequest (DDAP_PORT value)

where DDAP_PORT is the UDP port at which the SDA will listen for the SS Discovery Request.

DDAP—Discovery Device Appliance Protocol

DDAP is a UDP protocol that the site server uses to identify all SDA on the network and ready them for transmission of the Description Document. DDAP comprises two formats: Discovery Request and Discovery Response.

Discovery Request

The Discovery Request packet is sent by the SS in response to an NDAP Notification Request from the SDA. Its purpose is to notify the SDA that the SS is ready for establishment of the connection for CDATP which will control the transfer of the Description Document. In one embodiment, the request packet will target either:

All SDA; or

An SDA with a specified Friendly Name; or

An SDA with a specified Universal Device Name

The Universal Device Name (UDN) is a permanent, unique identity assigned at manufacture to each SDA. The Friendly Name may be assigned by the installing technician and is designed for easy recognition by system users. The Friendly Name need not be unique, for example, there may be more than one "Portal gate reader," however, each is differentiated by its unique UDN. If either the Friendly Name or UDN are present, then the SDA that matches the identification will respond to the request If both the Friendly Name and the UDN are not specified in the packet, then all SDA will respond. The latter function is typically performed at initialization time.

The DDAP Discovery Request UDP packet specifies:
SS IP as source address
Broadcast IP destination address
Destination UDP port of DDAP_PORT The Discovery Request message format is:
DDAPRequest (DDAP_INTERVAL value) (NDAP_PORT value) (EDATP_PORT value)
<CRLF>
(Friendly Name) (UDN value) <CRLF> where DDAP_INTERVAL is the time interval from which the SDA will choose a random time at which to respond to the SS with the DDAP Discovery Response packet. In the preferred embodiment, DDAP_INTERVAL is 10 seconds.

NDAP_PORT is the port at which the SS will listen for the SDA response to the Discovery Request. In the preferred embodiment, NDAP_PORT is 10000.

EDATP_PORT is the port at which the SS will receive event messages from the SDA. In the preferred embodiment, EDAPT_PORT is 10010.

To provide for collision resolution, the Discovery Request will be repeated DDAP_TRIES times. In the preferred embodiment, DDAP_TRIES is 3. On receipt of the Discovery Request, the SDA responds with the DDAP Discovery Response packet at a random time within DDAP_INTERVAL seconds.

Discovery Response

The SDA responds to the Discovery Request packet by sending the DDAP Discovery Response packet at a random time selected from time interval DDAP_INTERVAL.

The DDAP Discovery Response UDP packet specifies:
SDA IP as the source address
SS IP as the destination address
Destination UDP port of NDAP_PORT The Discovery Response message format is:
DDAPResponse (CDATP_PORT value)<CRLF>
(Friendly Name|EMPTY) (UDN value)<CRLF> where CDATP_PORT is the TCP port that the SDA will listen on to receive command packets from the SS. In the preferred embodiment, CDATP_PORT is 10011. Friendly Name is the name of the SDA or the keyword EMPTY. The UDN value is the Universal Device Name (UDN) of the particular SDA.

CDATP—Control Data Appliance Transfer Protocol

CDATP is a TCP protocol used to send commands, including the command to upload the Description Document. A site data appliance listens on CDATP_PORT for a connection from an SS. In the preferred embodiment, CDATP_PORT is 10011. The SS sends commands over this socket connection which are then executed by the SDA. For each command, the SDA will complete processing and return a response to the SS before accepting another command. This is a TCP connection and thus the SS can issue any number of commands without necessity to re-establish the connection. The SS should shutdown the connection as soon as it is done with the immediate task and should be prepared for the socket connection to be broken at any time (an SDA reset, a faulty hub or power fluctuations). The socket connection is typically not maintained longer than a second.

A command is comprised of ASCII characters terminated with a carriage return/line-feed. Following is an example of a Command format:
(command)<CRLF>

An example command is the word description. The Description command returns the Description Document in XML format.

EDATP—Event Data Appliance Transfer Protocol

EDATP is a TCP protocol that a site data appliance uses to transfer event data. The site server (SS) listens on port EDAT- P_PORT for an event from an SDA. In the preferred embodiment, EDATP_PORT is 10010. Each event is an ASCII text line terminated by a <CRLF>. The format of an EDAPT event:

| field | range | length | description |
|---|---|---|---|
| sequence number | 00-FF | 2 bytes | Unique sequence number as hex-ASCII |
| flag | 00-FF | 2 bytes | flag as hex-ASCII. See below. |
| day of year | 001-365 | 3 bytes | Julian day of year as decimal number |
| second of day | 00001-86400 | 5 bytes | second of day as decimal number |
| reserved | — | 4 bytes | Reserved as 4 dashes. |
| event object | ASCII | n bytes | Source of event where n is the element reference. |
| space | 0 x 20 | 1 byte | A space separates the event element from any event text that follows. |
| event detail | ASCII | m bytes | Any descriptive text associated with this event. |
| line end | 0 x 0d0a | 2 bytes | event line end (CRLF) |

Each event upload will consist of 1 to 127 event lines terminated by a <CRLF>. A null line (a line with only <CRLF>) terminates the event uploads. When the Site Server receives the null line, it will send the event response to the SDA with the number of events received (which includes any events that the SS discarded via duplicate rejection). Multiple event uploads can occur on the same socket connection. However, in each upload no more than 127 events are to be uploaded before the SDA receives a response from the SS. The Event response message format:
(number of events received) <CRLF>
Following is an example of an event exchange:
The SDA sends event message 1:
IA0012386399 - - - rfid.collect.event tagID=21368 data="four" antenna[2].RSSI=123<CRLF>
The SDA sends event message 2:
1B0012386399 - - - rfid.antenna.event antenna[1]= FAIL<CRLF>
The SDA sends the end of messages signal:
<CRLF>
The SS responds, informs the SDA that the SS has received two event messages:
2<CRLF><CRLF>
Sequence Number The Site Server will compare the sequence numbers in the current upload with the sequence numbers in the previous upload. Events from the current load that match in sequence number the previous load are discarded. For example, the SDA uploads 7 events with sequence numbers 0xA0 through 0xA6 and does not receive a response within the allowed timeout period. The SDA buffers 3 more events before the upload is retried, in the second case with all 10 events with sequence numbers 0xA0 through 0xA9. The duplicated events are detected using the sequence number and thus the Site Server discards the first 7 (0xA0 through 0xA6) events from the second upload.
Flag The flag field indicates special circumstances:

| name | code | description |
|---|---|---|
| BREAK | 0 x 01 | previous event not sent |
| SUPER | 0 x 02 | supervisory event |
| TEST | 0 x 04 | SDA.control = TESTMODE |

The BREAK flag indicates that the sequence number of the current event and the previous event were not consecutive. The SUPER flag indicates that this event indicates a failure that requires service. The TEST flag indicates that the event was generated while the SDA was in test mode. Further flags may be added to indicate special behavior required by the event, for example, to indicate that an XML document follows the event code. This may be needed when an SDA delivers a complex document such as a shipping bill to the Site Server and it may be necessary to store these large "events" as files. In this situation, a flag would serve to indicate a file management situation.
Time Stamp The time stamp consists of the Julian day and the second of the day, thus uniquely defining the event. The event time stamp may not always be in sequence, for example after a time adjustment has been made to the SDA.
Event Object The event object is a character string that uniquely identifies the event source and event type.
Event Detail The event detail will depend on the specific capability of the SDA and the requirements for processing events in the Business Logic and Data Center.

Figure 1:
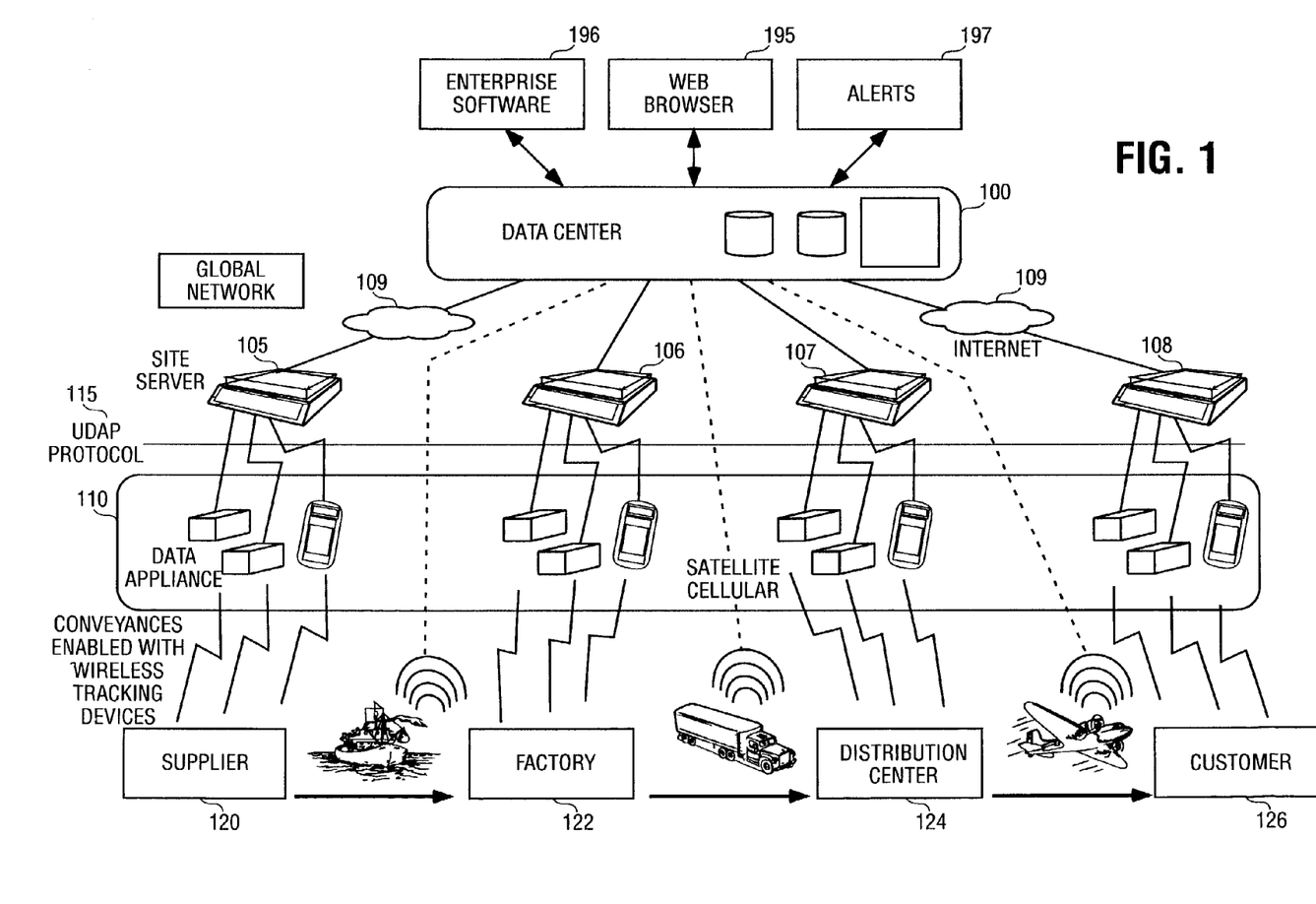
FIG. 1 is a network diagram illustrating a supply chain network.

FIG. 1 is a network diagram illustrating one embodiment of a supply chain network. Data sources (e.g., RFID tags or other devices that are able to provide information) are attached to boxes, totes, racks, pallets, containers, etc., and provide identification information as well as other information (e.g., size, weight or container contents). For example, as a container carrying a specific part is transferred from a source site (the supplier 120) to a destination site (the customer 126), the data source on the container may be read by the DSE in the supplier 120, the factory 122, the distribution center 124 and the customer 126, thus providing location and status information. In addition, while in transit, the location of the container may also be tracked using satellite cellular communication.

The data source may be automatically read by a DSE strategically positioned in different locations (e.g., supplier 120 or distribution center 124). The information from the data source is sent to one of the SDA in the SDA group 110 which then sends the information to one of the SS 105-108 using the UDAP protocol.

Each of the SDA is uniquely identified in the supply chain network. As such, a combination of the information from the data source, the associated DSE and the associated SDA may be used to determine the location of the data source and/or time the data source was detected.

As described supra, the interface specifications from each of the DSE may include, for example, command syntax information or event information. The command syntax information may be used to issue commands to the DSE to retrieve configuration information. The event information may be used to determine status of the DSE. For example, the DSE may generate an event including error condition information to notify that the DSE has a faulty indicator. When an SDA in the SDA group 110 experiences problems, such as read errors, that SDA may generate error messages and send them to the appropriate SS 105-108.

In one embodiment, each of the SDA in the SDA group 110 may also send its own information to one of the SS 105-108. When a new SDA is inserted into the site supply chain network, the new SDA automatically initiates execution of the discovery procedure that will bring it online to the SS. This automatic installation procedure is executed using the UDAP protocol and the Description Document as will subsequently be described.

Referring to FIG. 1, when the DC 100 receives error information from a DSE connected with the SDA in the SDA group 110, alerts can be generated and sent to the appropriate user or operator interface 197 using, for example, email or fax. In one embodiment, an SS 105-108 stores the information received from an SDA and periodically forwards that information to the DC 100. This allows the SS 105-108 to send an aggregate of information without requiring a continuous connection with the DC 100. The DC 100 may also query the SS 105-108 at any time to request that the information be sent.

In one embodiment, connection between the DC 100 and the SS 105-108 is through the Internet 109. Alternatively, the connection may also be through a dedicated line such as, for example, the connection between the DC 100 and SS 106 and 107. One skilled in the art will recognize that other types of connection may also be used. The information communicated from the SS 105-108 to the DC 100 may be accessed via a web browser 195 through the Internet. The information may also be accessed by enterprise software 196 for further processing to fulfill customer needs to strategize ordering processes or to compensate for shortfalls in product that are being detected through the supply chain data.

Figure 2:
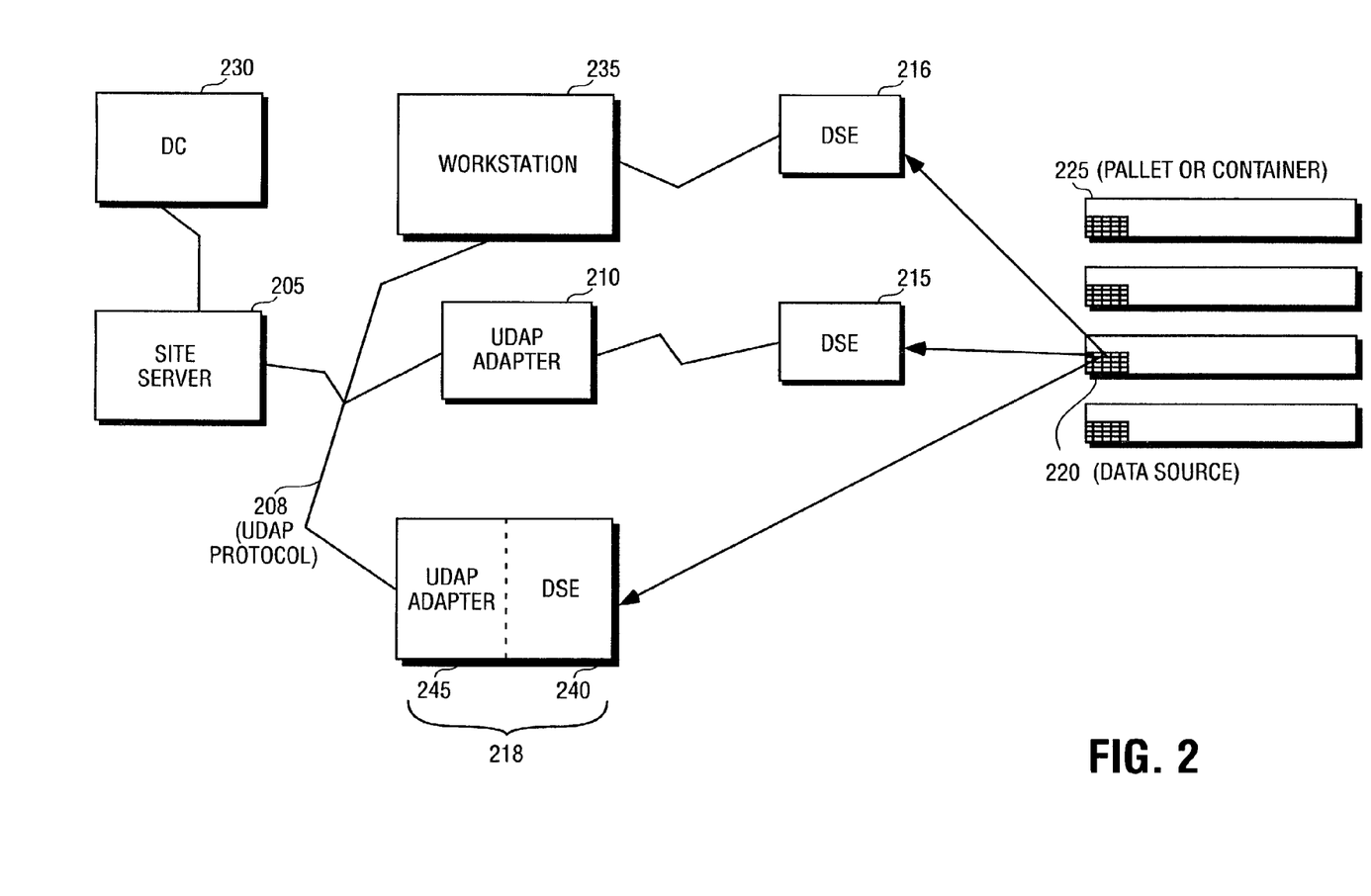
FIG. 2 is a block diagram illustrating details of one embodiment of a supply chain network.

FIG. 2 is a block diagram illustrating one embodiment of a site supply chain network. Data source equipment (DSE) 215 (e.g., RFID reader, bar-code reader) reads data from data source 220 (e.g., RFID tags, bar codes). The data source 220 may have been placed on a pallet or a container 225. For example, the data source 220 may be an RFID tag such as an Intellitag model 500 tag and the DSE 215 may be an RFID reader such as an Intellitag Reader from Intermec Technologies Corporation.

Communications moving along communication link 208 between the site server 205 and the SDA 210 use the UDAP protocol. Data source equipment 215 is a typical example of equipment that does not have UDAP capability, therefore a UDAP adapter 210 is required. UDAP adapter 210 may be connected with the DSE 215 using a data port such as, for example, an RS-232 port. UDAP adapter 210 translates the UDAP protocols from SS 205 into the command structure necessary for communications between DSE 215 and SS 205. UDAP adapter 210 receives data (e.g., tag ID) from data source 220 through DSE 215 and translates it for transmission to the SS 205. UDAP adapter 210 also retrieves configuration data including hardware diagnostic information, temperature, transmit power and antenna connection from DSE 215, translates and forwards single tag read/write commands and configuration commands from SS 205 to DSE 215 and may download new firmware to DSE 215.

UDAP adapter 210 may be implemented in hardware or software. For example, the UDAP adapter 210 may be a hardware device separate from the DSE 215. Alternatively, UDAP functionality may be integrated and implemented in software resident in, for example, workstation 235. In this case, workstation 235 is coupled with DSE 216 and communicates via link 208 to SS 205 using the UDAP protocol. The software may reside in a storage media or it may be in firmware (e.g., read-only memory (ROM)).

Workstation 235 and UDAP adapter 210 serve as interfaces between DSE 216, 215 respectively and the SS 205. In one embodiment, the workstation 235 may also perform other functions, for example, as a print server for the site. Alternate forms of configuration may find, for example, DSE 240 and UDAP adapter 245 integrated within one device, SDA 218. The SDA 218 is connected directly with the SS 205, again over link 208. In one embodiment, workstation 235, UDAP adapter 210, SDA 218 and the SS 205 are all connected via an Ethernet network. The SS 205 is connected with the DC 230.

Figure 3:
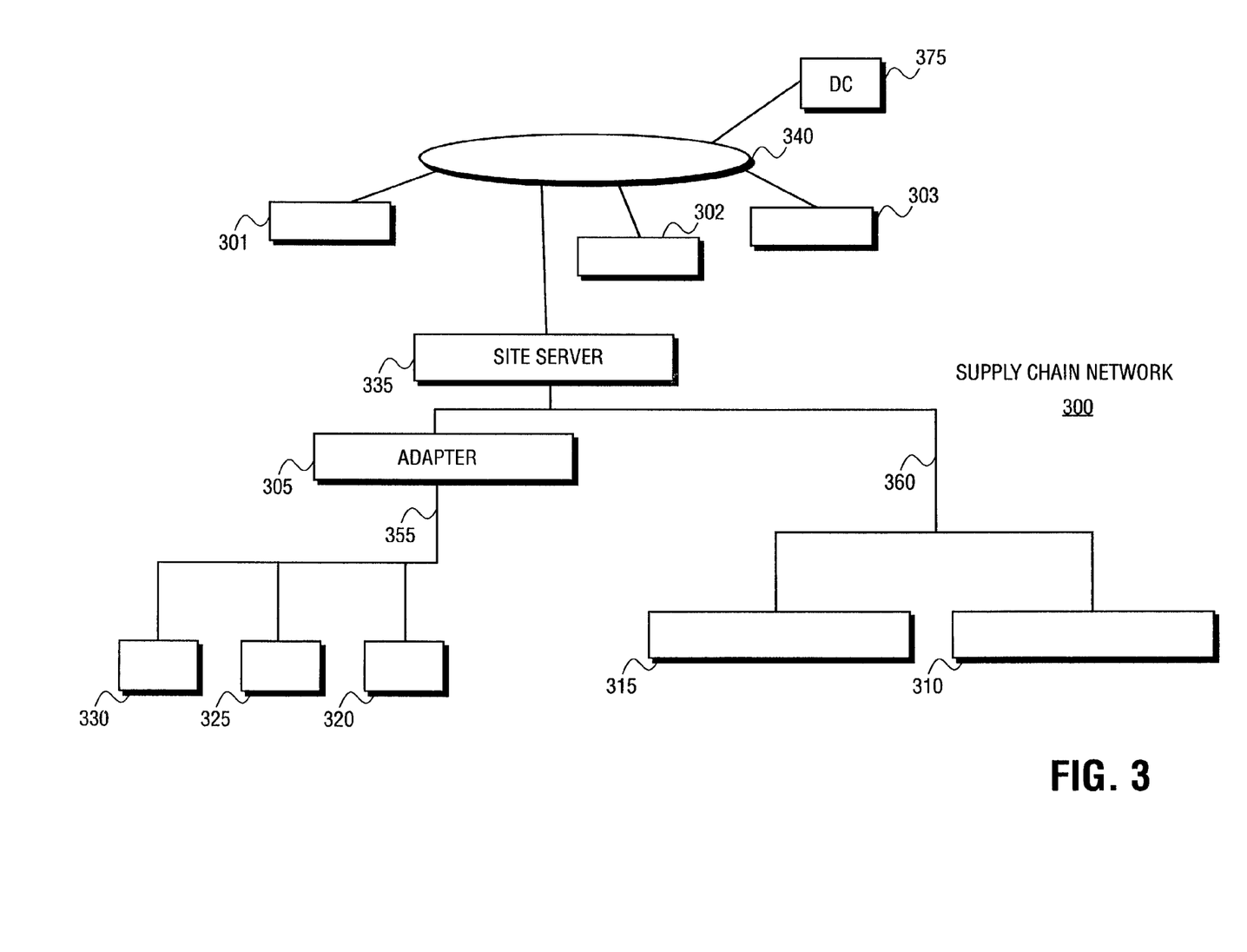
FIG. 3 is a block diagram illustrating one embodiment of a supply chain network having UDAP integrated SDA devices and third party devices connected to a UDAP adapter.

FIG. 3 is a block diagram illustrating one embodiment of a supply chain network 300 to which multiple site servers are connected. For example, site server 335 uses the UDAP protocols to communicate via connection 360 to multiple SDA. For example, the devices 310, 315 may be UDAP integrated SDA devices similar to the SDA 218 in FIG. 2. The devices 320, 325, 330 may be a DSE similar to the DSE 215 in FIG. 2. When Description Documents are to be transferred to SS 335, each of SDA 310 and 315 assembles the information from its internal storage and from its respective integrated DSE and transfers the information to the SS. UDAP adapter 305 assembles the specification information from each of DSE 320, 325 and 330 using connection 355 and then sends the information to the SS 335 using the UDAP protocols over connection 360. Each of DSE 320, 325, 330 has a permanent unique universal device name (UDN) assigned by the manufacturer. In one embodiment, a local name, known as a Friendly Name, may be also used to identify the DSE. Using a Friendly Name (for example, "Rear Door, right side" instead of "A-00-12435"), instead of the abstract UDN, facilitates the users in locating and identifying the DSE. As described earlier, connection 360 may be an Ethernet connection, communications over which are controlled by the UDAP protocol.

The supply chain network 300 may be part of a larger network 340 having connection to networks 301, 302 and 303. The network 340 is connected to a data center DC 375 which may serve as a centralized data collection point where network management information (e.g., alerts or error messages) is collected. In one embodiment, the SS 335 is connected with DC 375 through the Internet (e.g., the connection between the SS 108 and the DC 100 in FIG. 1). Communication between the SS 335 and the DC 375 may be implemented using protocols such as HTTP (HyperText Transfer Protocol). It will be apparent to one skilled in the art that other methods of connecting the SS 335 to the DC 375 may be used.

Figure 4:
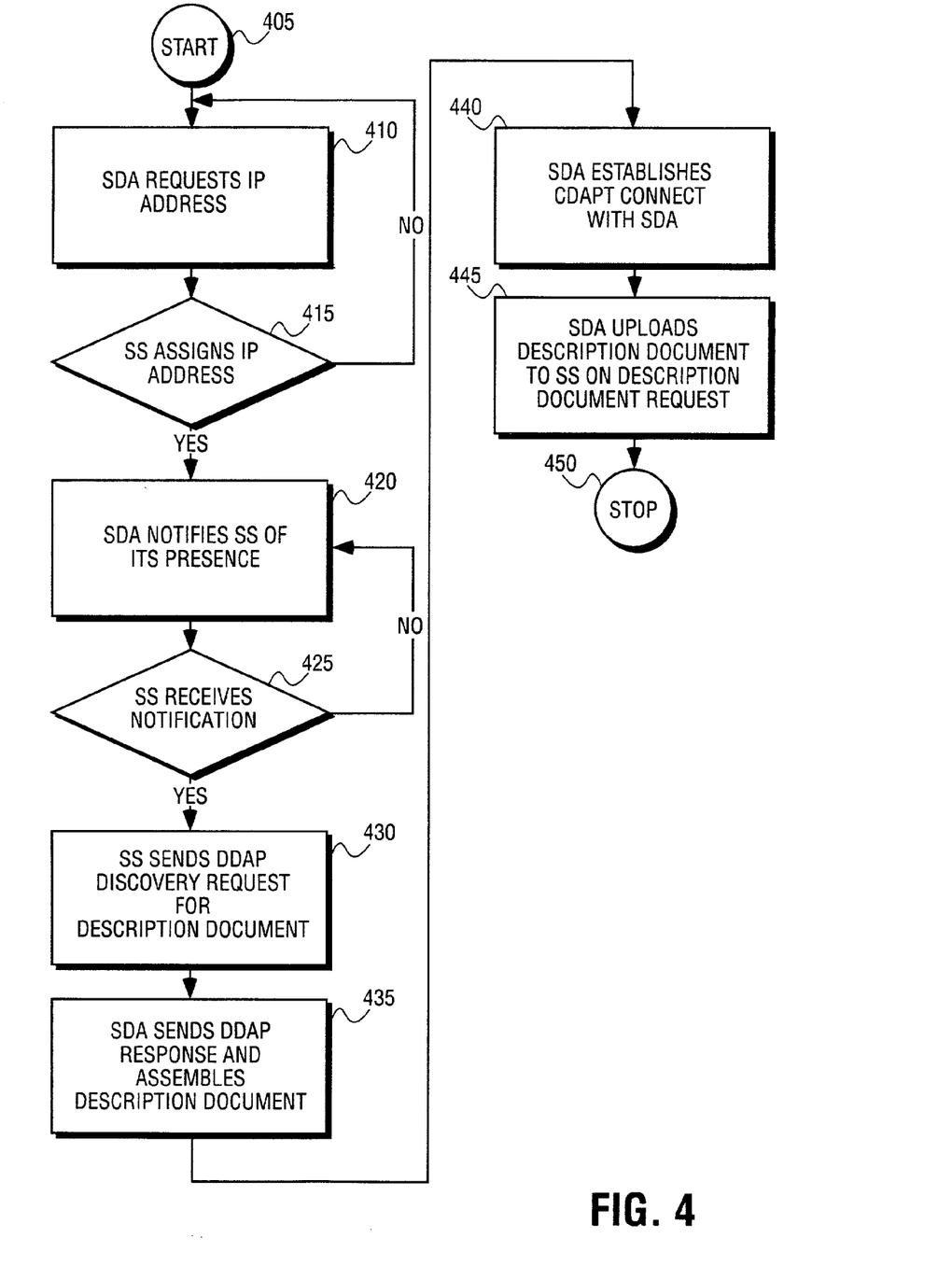
FIG. 4 is a flow diagram illustrating one exemplary process of SDA discovery.

FIG. 4 is a flow diagram illustrating an exemplary process of an SDA discovery and automatic installation. Automatic installation and discovery of an SDA are accomplished by each SDA formatting a Description Document in the XML language and transferring that information to the site server using the UDAP protocol. The SDA is completely characterized by its Description Document, which can be viewed with or without an SS. Configuration of the SDA and DSE may be achieved through different scenarios. For example, the SDA may be pre-configured by the installer based on previous site surveys of the customer site. These parameters are then immediately available for the Description Document. Alternately, the SDA may be brought to the site for installation without being configured. The installer will mount and connect the SDA and then insert the parameters into the device using a portable computer. Verification of the configuration may be made by accessing the SDA directly, or through the SS, using the portable computer.

The process in FIG. 4 starts at block 405. The SDA is physically installed and power is turned on. The SDA then sequences through its POST (Power On Self Test) and at block 410 sends a BOOTP communication to the SS to request an IP address. In one embodiment, the SS may assign the IP address to the SDA automatically when the SDA is plugged into the site supply chain network, as shown in block 415. As discussed supra, BOOTP is a standard UDP protocol implemented in the UDAP protocol suite. When the boot process is completed, the SDA has obtained an IP address which identifies the SDA on the network. Alternatively, the IP address may be assigned by an operator running a utility on a portable computer attached directly to the SDA.

At block 420, after reception of its IP address, the SDA sends the SS a notification request packet using NDAP, a member of the UDAP protocol, to notify the SS that it is online. At block 425, the SS has been listening for the NDAP notification packet. When the SS receives the notification packet, it sequences to block 430 to acknowledge the notification request by sending the discovery request packet using DDAP, another of the UDAP protocol.

At block 435, the SDA receives the DDAP discovery request packet and responds with the DDAP discovery response packet.

At block 440, after assembling the Description Document, the SS establishes a CDATP connection with the SDA for transmission of the Description Document. The SDA then proceeds to assemble the Description Document information for transmission to the SS as discussed supra.

At block 445, the SS receives the Description Document and forwards it to the Data Center where it is parsed and the information stored in the Configuration Table as an installation record for the particular SDA. In addition, the SS synchronizes the SDA time clock using the SNTP protocol.

At block 450, the sequence ends. The SDA is now operational. Commands to the SDA (e.g., status, read poll, set status indicators, select antenna or shut down) are communicated using the CDATP protocol which also handles the acknowledgements. Events that occur (e.g., tag reads or equipment failure) are communicated from the SDA to the SS, and acknowledged, using EDATP as discussed supra.

The Description Document may need to be updated if the SDA is replaced or reconfigured. Referring to FIG. 4, if the SDA is replaced, the sequence enters at block 405 and continues as described supra. If the SDA has been updated or reconfigured, the sequence would typically be entered at block 420. In either of these cases, sequencing continues to block 450 resulting in a new Description Document sent to the SS.

Description Document

The Description Document is composed in extensible markup language (XML) and provides specifications, properties, methods, and events of the DSE and also of the SDA. For example, the Description Document may include specification information about the DSE such as product name and type and operating modes. The DSE properties may include syntax information of commands recognized by the DSE. Methods may include information about capabilities of the DSE (e.g., the DSE may be enabled to write data to a tag). The events may include information about events that the DSE is capable of generating (e.g., write error or read failure).

The Description Document is formatted in human readable form, rendering the document easy to read by the user or maintenance personnel using simple communication programs such as telnet. In contrast, many existing systems provide the data available only in machine language code (i.e., binary codes), rendering access and manipulation of the information regarding the equipment cumbersome. For this reason, maintaining a record of the current configuration of a device may be difficult because the device evolves faster than the management software. For example, a new parameter for a device may require modifications to the database or other viewing engine to accommodate the new information. Report software may need to be updated to display, modify or compare the new field. Availability of the Description Document addresses this problem since the information is presented in easily readable form and the document may be modified simply be entering new format tags with accompanying data.

In one embodiment, the Description Document may include specification information for more DSE than the actual number of connected devices. That is, the Description Document may include description information for a DSE that has been ordered for a site however, it has not been delivered or not been connected. In this situation, the description information for the DSE may be disabled in the Description Document. When that DSE is connected, the description information for that DSE is changed to "enabled". Thus, the commands for this new DSE can be made available at the SS or the DC in a short time. By viewing the Description Document, a user can see what events are available from the DSE and the commands to enable or disable each event.

The Description Document provides a menu of commands that can be performed on the SDA and associated DSE. The syntax for the Description Document is in a dotted node format in accordance with the document object model (DOM) dotted node designation format. Thus command syntax can be read directly from the Description Document. For example, the information for a departure command may be written as:

```
<a>
    <b>
        <event> DEPARTURE </event>
        <status>OK</status>
    </b>
</a>
```

Using the dotted node syntax, the command to enable "departure" events would be written as: a.b.event=DEPARTURE. When an event is generated, a dotted node string derived from the Description Document identifies the event to the SS and the DC. In the above example, the event may be reported as:

0001123123456    -    -    -    a.b.event DEPARTURE<CRLF><CRLF> where the number at the left is the EDAPT event header which includes a time stamp and other information about the event. When the event is received by the DC, information about the SS (e.g., SS product ID) and the SDA (e.g., UDN number) is included to enable the DC to identify where the event was generated.

Figure 5B:
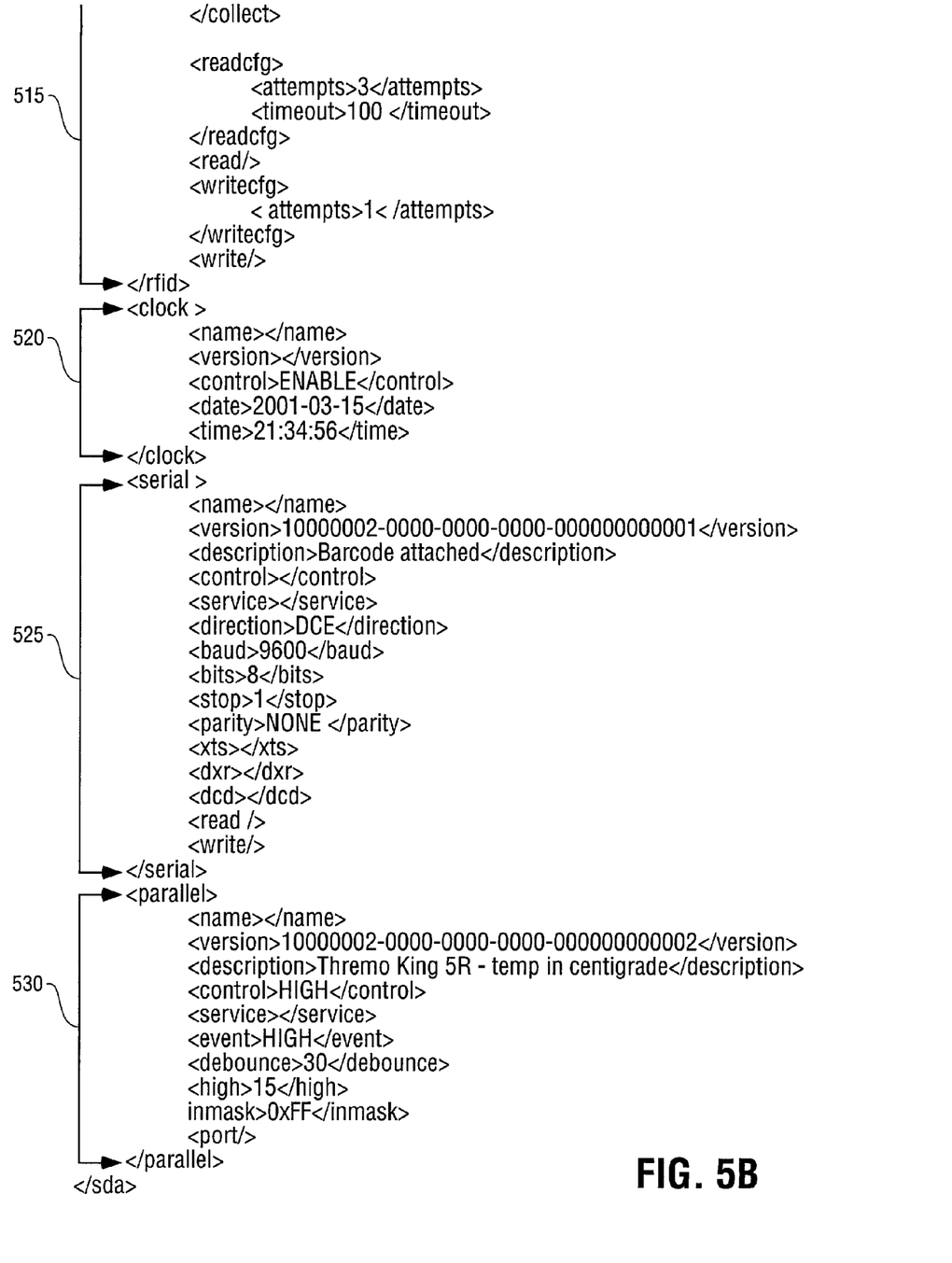

FIGS. 5A and 5B illustrate an exemplary Description Document. The document starts with an <sda>tag which is the root element of the Description Document. All other elements will be nested inside the <sda>tag and its closing </sda>tag. Nested elements may include elements for product information, network management, log container element, device container elements, etc.

Referring to FIG. 5A, group 500 provides information about the SDA. This information may include, for example, name of manufacturer, domain name of the manufacturer, product name, model number, manufacturing date, universal name, friendly name, etc. Group 505 exemplifies control information about an event log. In this example, the event log holds events waiting to be reported by the SDA to the SS. In one embodiment, there is no priority assigned to events and the event log stores the events in time order. A threshold is used to generate an event when the number of events in the log is excessive. Additionally, when the capacity of the event log is exceeded, new events may be discarded and a "lost" counter incremented.

Group 510 is shown as a single tag "<reset/>". This is a shorthand method of writing the null group <reset></reset>. There is no information related to the reset function, thus it is shown as a null group.

Group 515, at the bottom of FIG. 5A and continuing at the top of FIG. 5B, provides specification information about the connected DSE, in this example an RFID reader. Group 515 may include a friendly name, version number, descriptive text used for service and maintenance (e.g., last service date), antenna configuration, type of event (e.g., collect, departure), read configuration (e.g., the number of retries in case of a read error, the time to wait for completion of a read), write configuration (e.g., the number of retries in event of a error when writing to a tag).

Referring to FIG. 5B, Group 520 describes the SDA clock control ("ENABLE" command), and SDA time and date information. The SDA can be enabled to generate an event if there is a clock failure condition. Group 525 describes the serial port of the SDA (e.g., standard UART port in RS232 mode). An SDA serial port can be used to attach a third party reader such as, for example, a bar-code reader as shown in Group 525. On detection of a bar code read, an event could be generated to the SS so that the SS can issue a serial read to retrieve all bytes associated with the bar code. Group 530 describes the parallel port of the SDA and a device attached to this parallel port. The Description Document ends with the </sda>tag at the bottom of FIG. 5B. One skilled in the art would recognize that other groups may be used to provide additional descriptions (e.g., commands or events) about the SDA and the attached readers.

System maintenance may also be done remotely from the DC since the Description Document is uploaded from the SS to the DC, the maintenance may include, for example, increasing the RF range of an RFID reader to enable more distant tags to be detected and reported to the system, or downloading a software component or business logic to the SDA modify or install processes for events or to perform control functions at the reader. Since the Description Document provides all parameters in human readable form, maintenance and other tasks that are routinely performed are greatly facilitated. New features installed in the equipment or configuration modifications are easily interpreted without necessity to modify the existing user interface and control programs.

The stored Description Document may also be used for comparison with subsequent instances of the Description Document to correct configuration problems, for example, after a reader is swapped with another unit but the parameters have not been accordingly adjusted. In this event, read or detection errors may occur until the parameters are adjusted, which may be performed from the DC using the descriptive information in the document. The updated Description Document is then stored so that the site installation information incorporates the new reader information.

The Description Document may be viewed and or edited at the SS using a console or a portable computer, for example, to update configuration entries. The Description Document may also be uploaded to a remote site to allow information about the SDA or DSE to be analyzed and or modified. Information in the Description Document allows a diagnostician to request specific information from the DSE or to perform local commands. For example, if the function is supported by the tag, the DSE may be commanded to perform a write data to tag command. Each of these operations is facilitated by the fact that the Description Document is self-describing. It contains all the information necessary to perform the operation. All command and data syntax is always available and easily understood.

Figure 6:
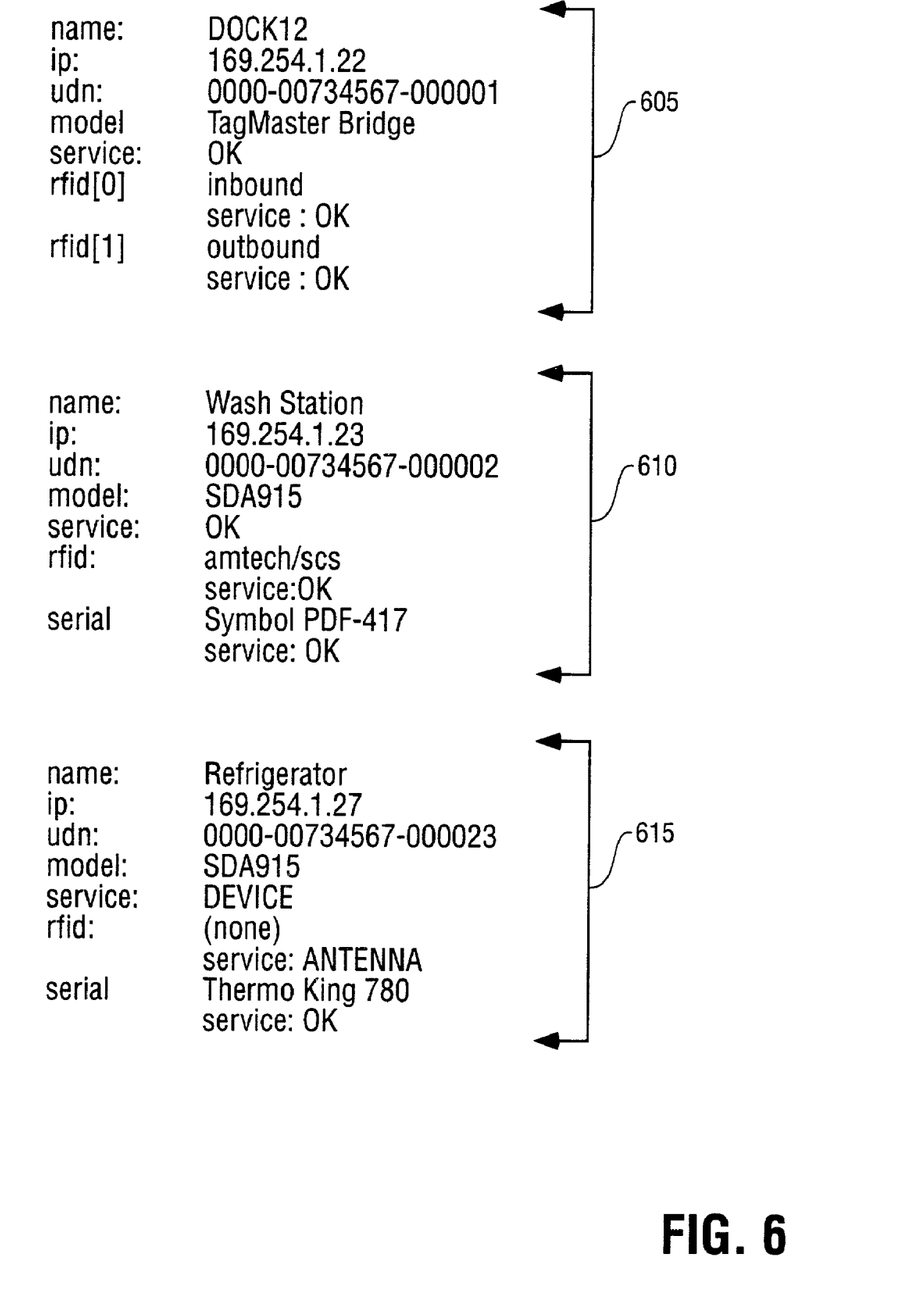
FIG. 6 is an example of a site configuration file.

FIG. 6 is an exemplary Configuration Table. The SS uses the Description Documents from each SDA to build a Configuration Table consisting of the IP address, the UDN, and the Friendly Name for each SDA along with various other parameters. The Configuration Table is uploaded to the DC and combined into a master Configuration Table which may be used as a reference by the DC for managing its network of SDA and DSE devices.

The Configuration Table illustrated in FIG. 6 consists of information for three SDA devices. The group 605 describes the first SDA having a Friendly Name "DOCK12" and IP address 169.254.1.22. Additional information for this SDA includes the unique UDN number, the SDA model, the number of attached readers and the type of readers (e.g., inbound, outbound). Group 610 describes a second SDA with the friendly name "Wash Station" which has an attached RFID reader manufactured by Amtech. The second SDA also has a device attached to its serial port. Group 615 describes a third SDA having an RFID reader and a device attached to its serial port, however, the manufacturer of the RFID reader is not identified.

Figure 7:
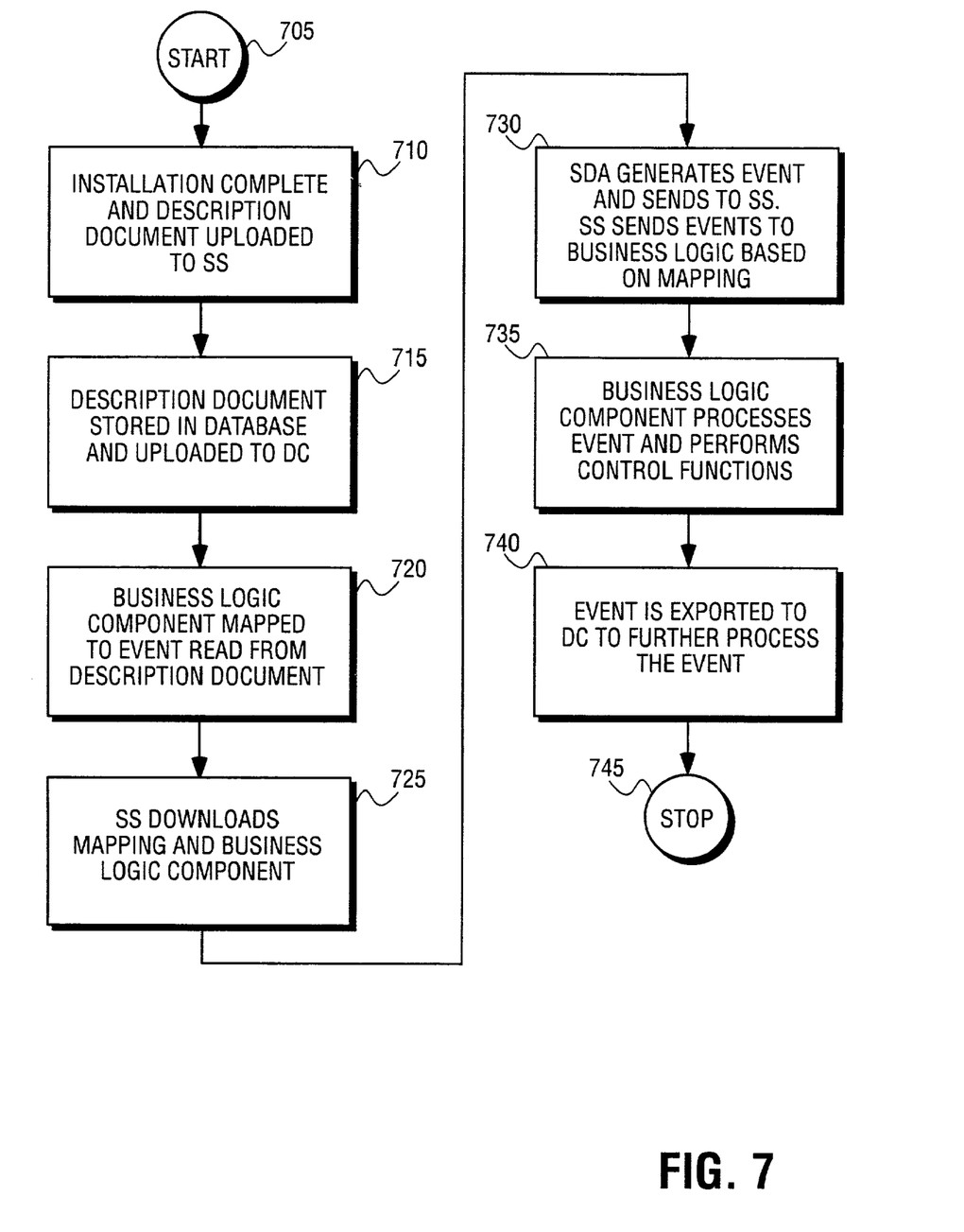
FIG. 7 is a flow diagram illustrating a process of mapping a business logic component to an event.

FIG. 7 is an exemplary flow diagram illustrating event processing using the map of business logic component to event. A business logic component refers to an event handler associated with a user, which has been assigned to an SDA and an event type. The process of FIG. 7 starts at block 705. As described earlier, the discovery sequence is complete when the SDA sends the Description Document to the SS as shown in block 710. The Description Document contains information that describes the objects (i.e., hardware/software components) available from the SDA, with their properties, methods and events clearly specified. The SS sends the Description Document of each SDA detected on the network to the DC, as shown in block 715. The Description Documents may be stored in a database at the DC. Since the Description Document is in XML language, an XML parser is used to parse the document. At the DC, the mapping of events to business logic for each SDA is performed as shown in block 720. This map is called a business logic dispatch table or dispatch table. After the dispatch table has been defined, an event generated from an SDA can be processed using the event handler. The list of events that can be generated by the DSE and its SDA is obtained from the Description Document. In some situations, a default event handler is specified to process events not associated with a specific event handler.

Subsequent to the mapping process, the dispatch table is downloaded from the DC to the SS as shown in block 725. When an event occurs at the SDA, the event is carried to the SS. At the SS, the business logic dispatcher accesses the dispatch table to find the appropriate event handler using the event object as the key, as shown in block 730. Event information (time, context, data, etc.) is then passed into the event handler for further processing, as shown in block 735. The event may also be exported to the DC for further processing, as shown in block 740. The process ends at block 745.

Figure 8:
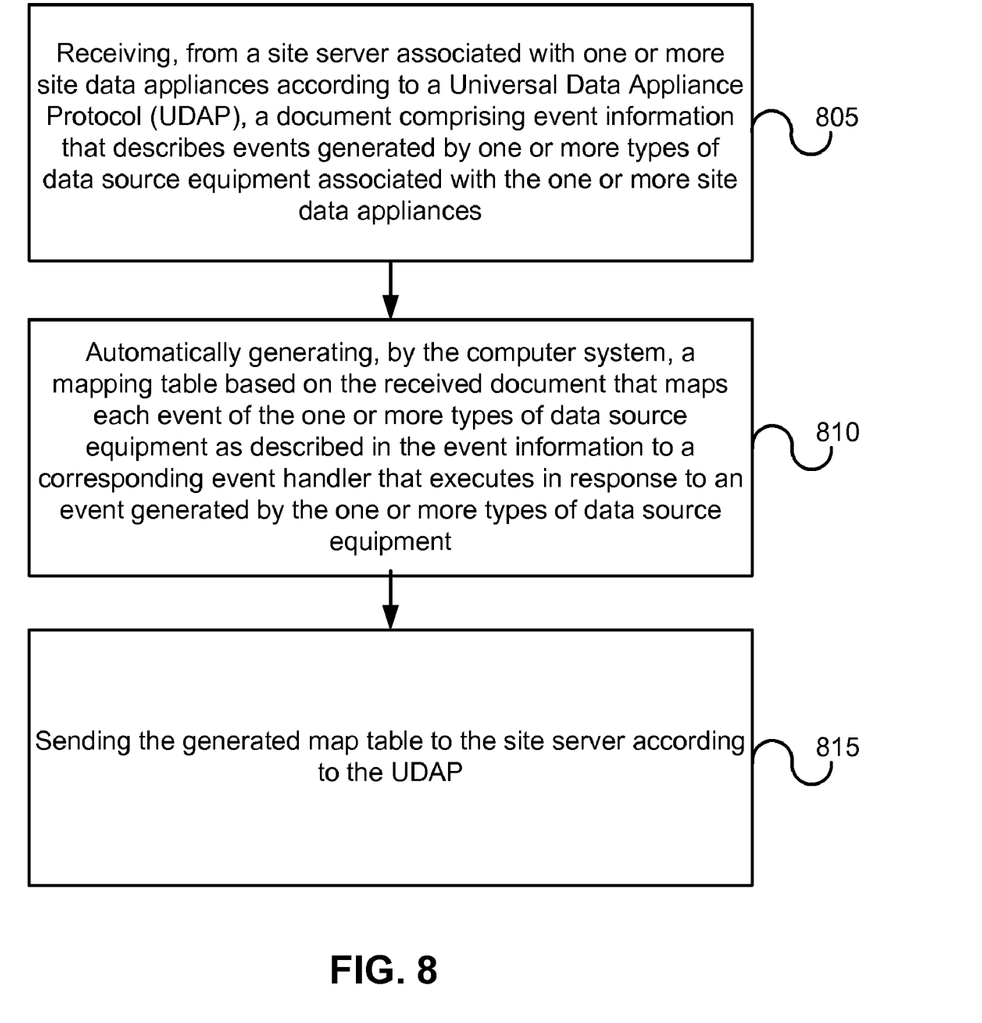
FIG. 8 is a flow diagram illustrating a process of a data center.
Figure 9:
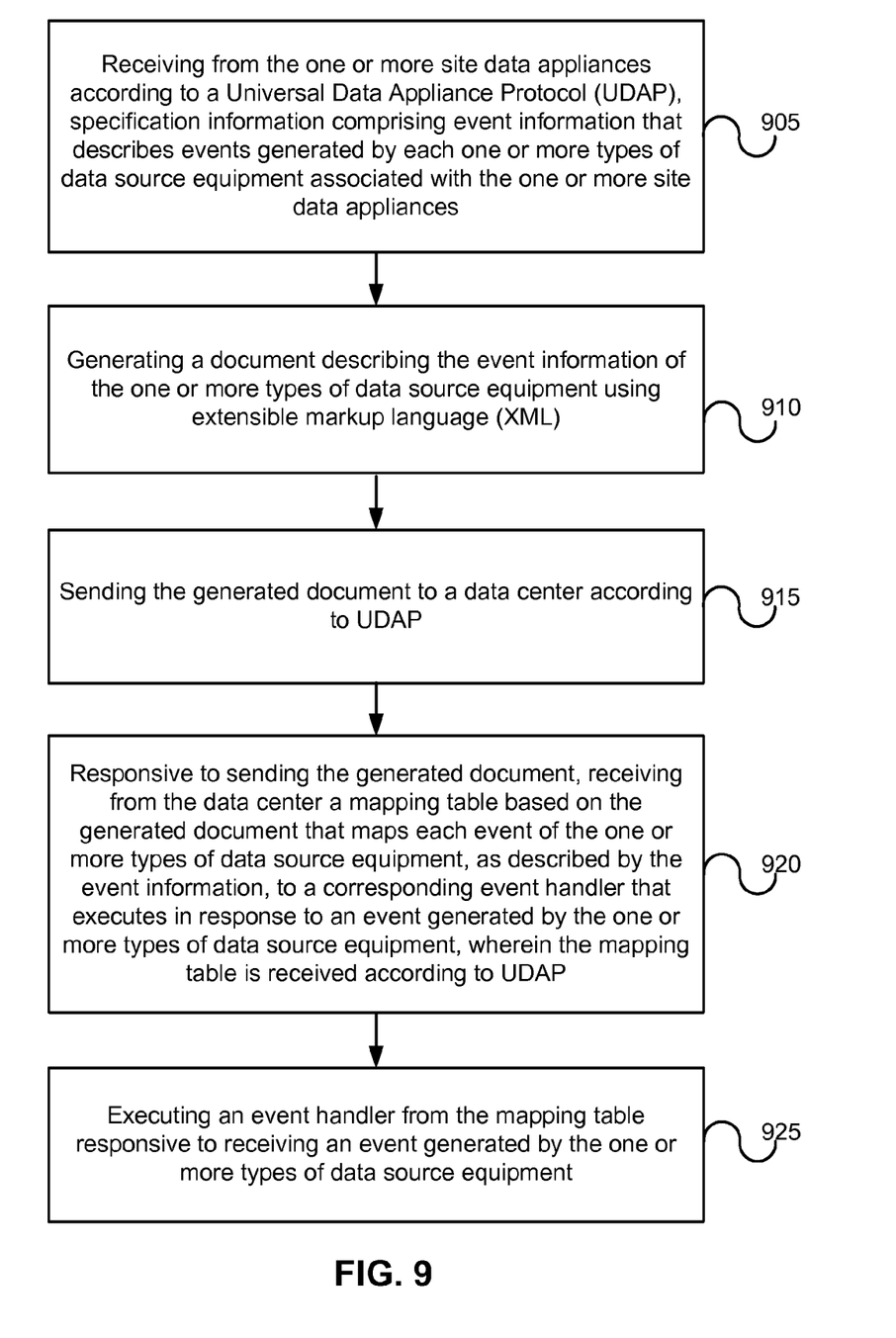
FIG. 9 is a flow diagram illustrating a process of a site server.

In sum, FIGS. 8 and 9 illustrate exemplary flow diagrams of processes respectively performed by the data center and site server previously described above. In FIG. 8, at block 805 the data center receives, from a site server associated with one more site data appliances according to a Universal Data Application protocol (UDAP), a document comprising event information that describes events generated by one or more types of data source equipment associated with the one or more site data appliances. At block 810, the data center automatically generates a mapping table based on the received document that maps each event of the one or more types of data source equipment as described in the event information to a corresponding event handler that executes in response to an event generated by the one or more types of data source equipment. At block 815, the data center sends the generated map table to the site server according to the UDAP.

Referring now to FIG. 9, at block 905 the site server receives from the one or more site data appliances according to a Universal Data Appliance Protocol (UDAP), specification information comprising event information that describes events generated by each one or more types of data source equipment associated with the one or more site data appliances. At block 910, the site server generates a document describing the event information of the one or more types of data source equipment using extensible markup language (XML). At block 915, the site server sends the generated document to a data center according to UDAP. At block 920, responsive to sending the generated document, the site server receives from the data center a mapping table based on the generated document that maps each event of the one or more types of data source equipment, as described by the event information, to a corresponding event handler that executes in response to an event generated by the one or more types of data source equipment, wherein the mapping table is received according to UDAP. At block 925, the site server executes an event handler from the mapping table responsive to receiving an event generated by the one or more types of data source equipment.

The operations of the various methods of the present invention may be implemented by a processing unit in a digital processing system, which executes sequences of computer program instructions which are stored in a memory which may be considered to be a machine readable storage media. The memory may be random access memory, read only memory, a persistent storage memory, such as mass storage device or any combination of these devices. Execution of the sequences of instruction causes the processing unit to perform operations according to the present invention. The instructions may be loaded into memory of the computer from a storage device or from one or more other digital processing systems (e.g. a server computer system) over a network connection. The instructions may be stored concurrently in several storage devices (e.g. DRAM and a hard disk, such as virtual memory). Consequently, the execution of these instructions may be performed directly by the processing unit.

In other cases, the instructions may not be performed directly or they may not be directly executable by the processing unit. Under these circumstances, the executions may be executed by causing the processor to execute an interpreter that interprets the instructions, or by causing the processor to execute instructions which convert the received instructions to instructions which can be directly executed by the processor. In other embodiments, hard-wired circuitry may be used in place of or in combination with software instructions to implement the present invention. Thus, the present invention is not limited to any specific combination of hardware circuitry and software, nor to any particular source for the instructions executed by the computer or digital processing system.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A system in a supply chain network, the system comprising:
    one or more site data appliances comprising one or more types of data source equipment, the one or more site data appliances using a Universal Data Application Protocol (UDAP) to collect specification information from the one or more types of data source equipment, the specification information comprising event information that describes events generated by the one or more types of data source equipment;
    one or more site servers coupled to one or more site data appliances that receive the specification information from the one or more site data appliances according to the UDAP and generate a document describing the event information of the one or more types of data source equipment; and
    a data center coupled to the one or more site servers that receives the document from the one or more site servers according to the UDAP and automatically generates a mapping table based on the received document that maps each event of the one or more types of data source equipment as described in the event information to a corresponding event handler that executes in response to an event generated by the one or more types of data source equipment.

2. The system of claim 1, wherein the data center sends the mapping table to the one or more site servers.

3. The system of claim 1, wherein the document is formed using extensible markup language (XML).

4. The system of claim 3, further comprising a portable device coupled with the one or more site servers to access an instance of the document.

5. The system of claim 1, wherein the specification information further comprises method and property information associated with the data source equipment.

6. The system of claim 5, wherein a dotted notation is used to identify the event, method and property information.

7. A method executable by a computer system in a supply chain network, the method comprising:
    receiving, from a site server associated with one or more site data appliances according to a Universal Data Appliance Protocol (UDAP), a document comprising event information that describes events generated by one or more types of data source equipment associated with the one or more site data appliances;
    automatically generating, by the computer system, a mapping table based on the received document that maps each event of the one or more types of data source equipment as described in the event information to a corresponding event handler that executes in response to an event generated by the one or more types of data source equipment; and
    sending the generated map table to the site server according to the UDAP.

8. The method of claim 7, wherein the document comprising the event information of the one or more data source equipment is formed using extensible markup language (XML).

9. The method of claim 8, further comprising accessing an instance of the document with a portable device.

10. The method of claim 7, wherein the document further comprises specification information including method and property information associated with the one or more types of data source equipment.

11. The method of claim 10, further comprising identifying, through dotted notation, the event, method and property information.

12. A method of a site server associated with one or more site data appliances in a supply chain network, the method comprising:
- receiving from the one or more site data appliances according to a Universal Data Appliance Protocol (UDAP), specification information comprising event information that describes events generated by each one or more types of data source equipment associated with the one or more site data appliances;
- generating a document describing the event information of the one or more types of data source equipment using extensible markup language (XML);
- sending the generated document to a data center according to UDAP;
- responsive to sending the generated document, receiving from the data center a mapping table based on the generated document that maps each event of the one or more types of data source equipment, as described by the event information, to a corresponding event handler that executes in response to an event generated by the one or more types of data source equipment, wherein the mapping table is received according to UDAP; and
- executing an event handler from the mapping table responsive to receiving an event generated by the one or more types of data source equipment.

13. The method of claim 12, wherein the document is formed using extensible markup language (XML).

14. The method of claim 12, wherein the specification information further comprises method and property information associated with the data source equipment.

15. A computer program product, comprising:
- a non-transitory computer-readable storage medium having computer program logic embodied therein that when executed by a processor:
  - receives, from a site server associated with one or more site data appliances according to a Universal Data Appliance Protocol (UDAP), a document comprising event information that describes events generated by one or more types of data source equipment associated with the one or more site data appliances;
  - automatically generates a mapping table based on the received document that maps each event of the one or more types of data source equipment as described in the event information to a corresponding event handler that executes in response to an event generated by the one or more types of data source equipment; and
  - send the generated map table to the site server according to the UDAP.

16. The computer program product of claim 15, wherein the document comprising the event information is formed using extensible markup language (XML).

17. The computer program product of claim 16, further comprising accessing an instance of the document with a portable device.

18. The computer program product of claim 15, wherein the document further comprises specification information including method and property information associated with the data source equipment.

19. The computer program product of claim 18, further comprising identifying, through dotted notation, the event, method and property information.

20. A system in a supply chain network for configuring asset tracking, the system comprising:
- a plurality of types of automated data source equipment, each data source equipment having associated specification information comprising event information that describes events generated by the data source equipment;
- one or more site data appliances, coupled to the automated data source equipment, the one or more site data appliances receive the specification information, from the plurality of types of automated data source equipment according to a Universal Data Appliance Protocol (UDAP);
- one or more site servers, coupled to one or more site data appliances, to receive the specification information from the one or more site data appliances according to UDAP and generate a document describing the event information of the plurality of types of automated data source equipment; and
- a data center, coupled to the one or more site servers, that receives the document from the one or more site servers according to UDAP and automatically generates a mapping table based on the received document that maps each event of the plurality of types of automated data source equipment as described in the event information to a corresponding event handler that executes in response to an event generated by one of the plurality of types of automated data source equipment.

* * * * *